Fig. 1.

W. J. Fedorchak
A. S. Jackson
INVENTORS

Dec. 16, 1947. W. J. FEDORCHAK ET AL 2,432,871
APPARATUS FOR TESTING AND SELECTING HOLLOW WARE
Original Filed Feb. 5, 1941 7 Sheets-Sheet 7

W. J. Fedorchak
A. S. Jackson
INVENTORS

BY Rule and Hoge
ATTORNEYS

Patented Dec. 16, 1947

2,432,871

UNITED STATES PATENT OFFICE 2,432,871

APPARATUS FOR TESTING AND SELECTING HOLLOW WARE

William J. Fedorchak, Granite City, and Albert S. Jackson, Wood River, Ill., assignors to Owens-Illinois Glass Company, a corporation of Ohio Original application February 5, 1941, Serial No. 377,468. Divided and this application April 18, 1944, Serial No. 531,588

11 Claims. (Cl. 73—43)

Our invention relates to apparatus for testing bottles, jars, and other hollow ware for detecting various imperfections and automatically discarding the defective ware. In the manufacture of glass bottles, jars, and similar ware, it is practically impossible to produce uniformly perfect articles owing to the inherent nature of the glass which must be molded while in a hot plastic condition. While in such condition and during the gathering and blowing of the glass in the molds, and the cooling, hardening and annealing process, it is subject to many infuences tending to distort the glass and introduce other imperfections.

An object of our invention is to provide automatic testing apparatus for detecting various defects such as small leaks or pinhole openings through the glass, imperfectly shaped finishes, crooked necks, imperfect neck openings and other defects and irregularities, and to segregate the defective ware or articles which do not pass the tests, from the other articles. The apparatus is adapted for detecting such defects which ordinarily are not discovered by the usual methods of manual inspection.

A further object of the invention is to provide an apparatus which is entirely automatic in its operation and which receives the bottles or other articles as they are discharged from the leer and tests them in rapid succession, selecting and discarding any defective articles, while those which stand the tests are conveyed to a packing table or other receiving means.

Other objects of the invention will appear hereinafter.

This application is a division of our copending application for patent on Apparatus for gauging glassware, on which U. S. Patent No. 2,352,091 was granted June 20, 1944.

Referring to the accompanying drawings which illustrate a machine for automatically testing bottles in accordance with the principles of our invention.

A brief description of the general construction and arrangement of the apparatus will now be given, followed by a more detailed description.

The apparatus comprises a series of gauging units 30, identical in construction, connected to form an endless chain and traveling continuously in a horizontal closed path spaced above a horizontal conveyor 85 on which the articles to be tested, here shown as bottles 34, are supported and travel with the gauging units. Each said unit 30 comprises a vertically-disposed supporting bar or frame 31 (Figs. 7, 8) in which is journalled a lifting spindle 32 adapted for rotation and also for up and down movement in the frame 31. The spindles 32 are tubular and each carries at its lower end a nozzle 33 which serves as a filling tube gauge and is adapted to enter the mouth of a bottle 34 when the spindle is lowered and seats on the bottle. The spindle when thus seated seals the bottle, permitting suction to be applied through the nozzle for forming a partial vacuum within the bottle. The hollow spindles 32 are connected by flexible pipes 35 to an annular series of suction valve units 36 (Figs. 1, 3, 7, 9) individual to said spindles. The valve units are attached to a vacuum distributing head 37 mounted on a continuously rotating shaft 38. Each of the valve units 36 includes a suction or vacuum valve 39 (Fig. 9) which is opened automatically, as hereinafter described, when the corresponding spindle has been lowered to seat on a bottle, whereby suction is applied to the bottle and a partial vacuum produced therein. The suction valve is then closed, leaving the vacuumized bottle sealed to the spindle. As the gauging unit 30 advances, the spindle is lifted by a stationary cam and the bottle, held thereon by suction, is also lifted and held in suspension.

If, for any reason, the lifting spindle when lowered onto a bottle fails to make a perfect seal, owing, for example, to a defective finish, or if the bottle is not accurately aligned with the nozzle, owing to a "rocker bottom" bent neck or other deformity, or if the size or shape of the neck opening is incorrect, then the bottle will not be sealed to the lifting spindle and there will be no vacuum established within the bottle and it will not be lifted but will remain on the conveyor 85 and will be discarded thereby and thus segregated from the bottles which are held by the spindles.

After a bottle has been vacuumized and the vacuum valve closed, the vacuum normally is retained within the sealed bottle, but if a slow leak prevents the bottle from being held by suction until the test has been completed, it will drop off the spindle onto the conveyor 85 when the vacuum is dissipated and will thus be discarded.

Figure 1:
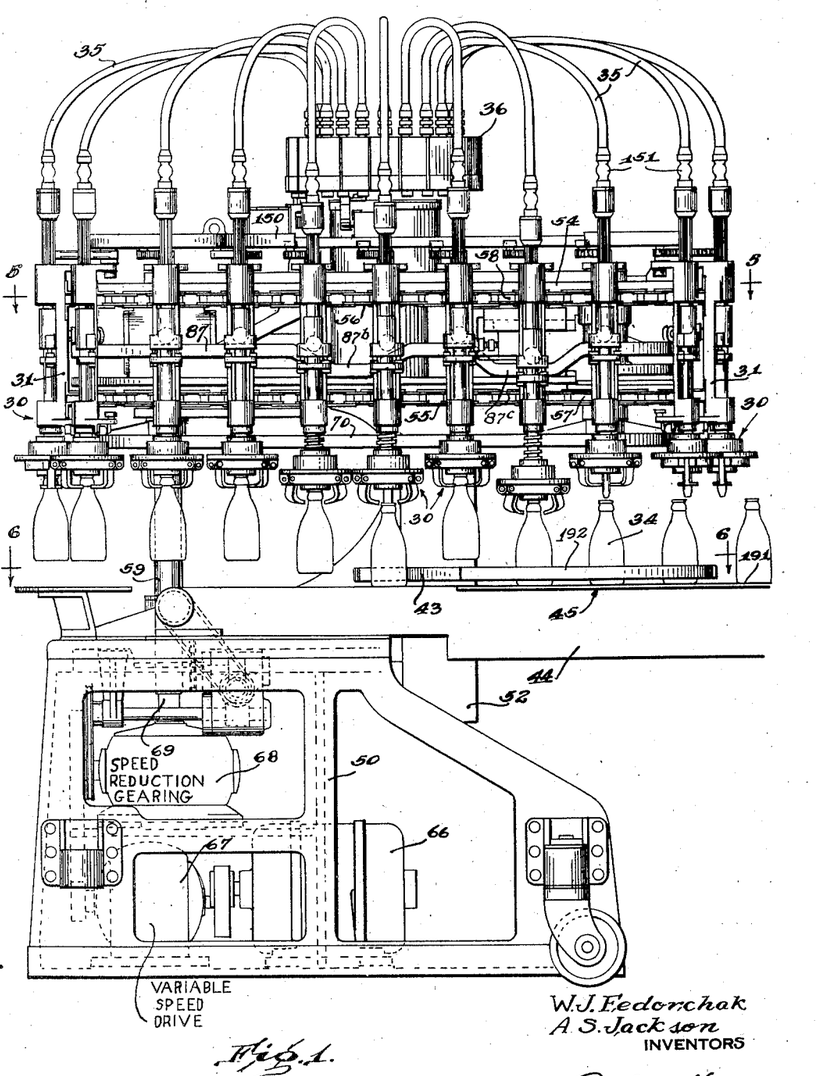
Figs. 1 and 2 are side elevations of the machine as viewed respectively from opposite sides of the machine.
Figure 2:
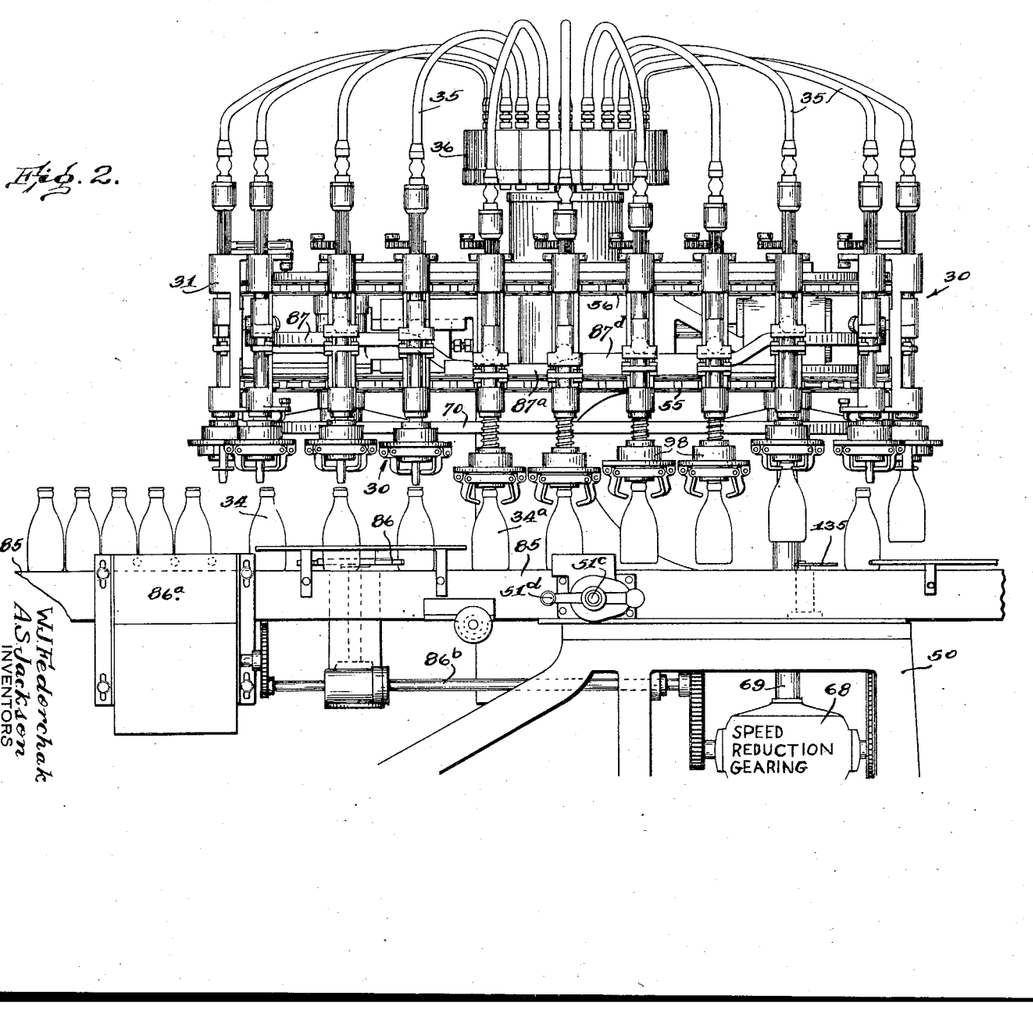
Figure 3:
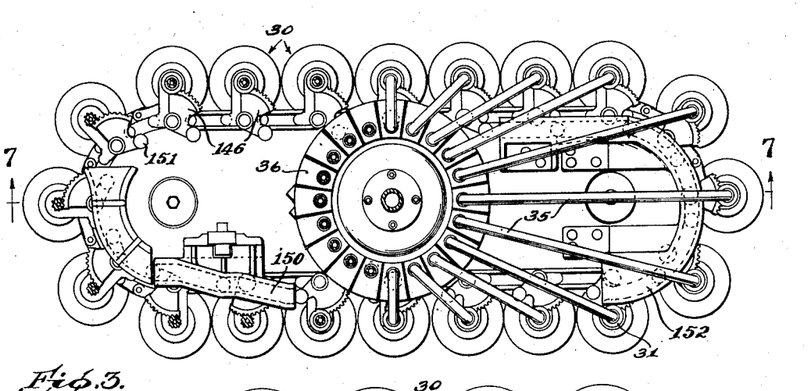
Fig. 3 is a part sectional plan view of the same.

A more detailed description of the mechanism will now be given. The testing apparatus as a whole is supported on a machine base 50 (Figs. 1, 2, 6, 7) from which rises a standard 51. A frame member 52, channel-shaped in cross section, embraces the standard 51 and is adjustable up and down thereon, for adjusting the testing mechanism up and down to accommodate bottles of different heights. Adjusting means for this purpose includes a nonrotatable screw shaft 51$^a$ (Fig. 7) carried by the frame member 52, a worm wheel 51$^b$ threaded on the screw shaft, and a worm shaft 51$^c$ to which is attached a hand crank 51$^d$ (Fig. 2). The frame member 52 provides a rigid support for the framework in which driving mechanism for the chain of gauging units is mounted. Said framework includes a lower horizontal platform 53 or floor and an upper table or platform 54 united thereto by an integral web 54$^a$.

Figure 5:
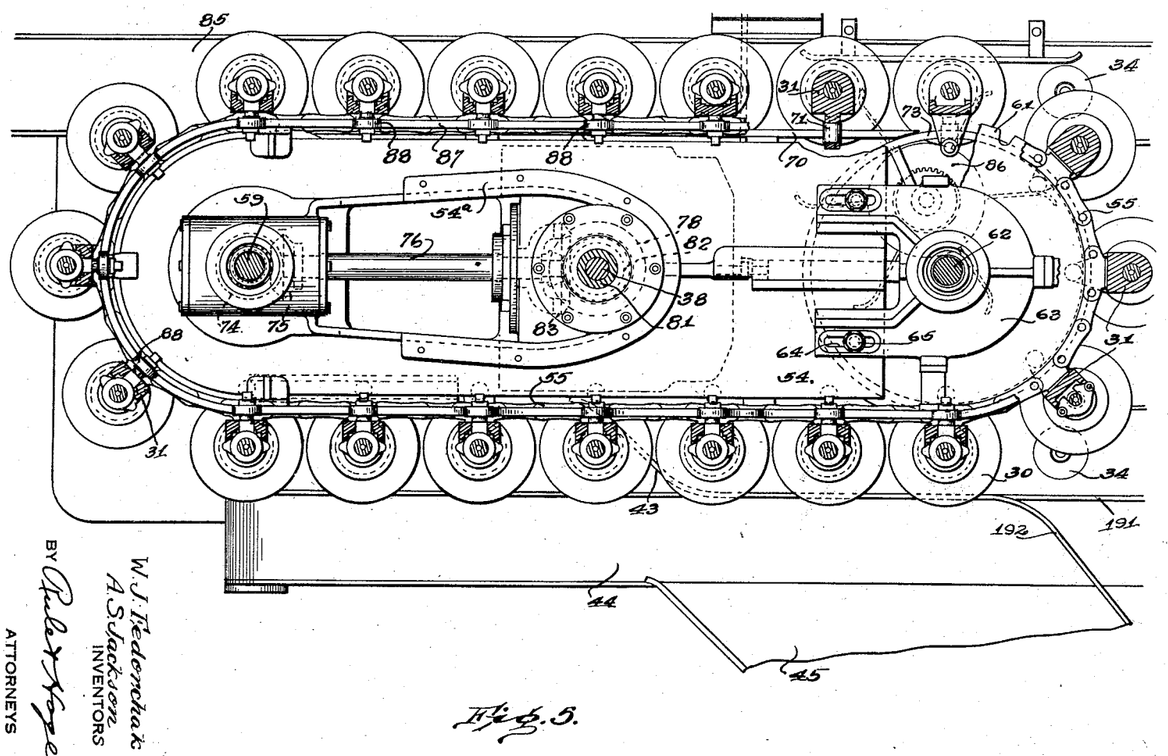
Fig. 5 is a sectional plan view of the apparatus, the section being taken substantially at the line 5—5 on Fig. 1.

The vertical supporting bars 31 of the gauging units are connected by links to form endless sprocket chains 55 and 56 which are trained over lower and upper sprocket drive wheels 57 and 58 respectively (Fig. 7), said wheels being keyed to a drive shaft 59. The sprocket chains are also trained over driven sprocket wheels 60 and 61 (Figs. 5 and 7) mounted on a shaft 62 journalled in a yoke 63. The yoke is formed with elongated slots 64 to receive clamping bolts 65 by which the yoke is bolted to the platform 54, said construction permitting adjustment to take up slack in the chains.

The driving mechanism comprises an electric motor 66 (Fig. 1) mounted in the machine base 50 and connected through a variable speed drive mechanism 67 and speed reduction gearing within a gear case 68 to a vertical drive shaft 69. The latter has a telescopic connection with the shaft section 59, permitting vertical adjustment of the framework 53, 54, carrying the gauging mechanism. The weight of the gauge unit frames 31 is carried by a horizontal track 70 (Figs. 1, 5, 7) on which run rolls 71 on the frames 31 while said frames are traveling in a straight line. Keyed to the shafts 59 and 62 for rotation therewith are rotary supporting members in the form of wheels 72, the peripheries 73 of which provide circular tracks onto which the rolls 71 run and by which the gauge frames 31 are supported as they travel in an arc about the axes of said shafts.

The vacuum distributor 37 (Fig. 7) in which a partial vacuum is continuously maintained, is driven from the shaft 59 through a train of gears comprising a bevel gear 74 keyed to the shaft 59 and meshing with a bevel gear 75 keyed to one end of a horizontal drive shaft 76, on the other end of which is keyed a gear 77 running in mesh with a gear 78 keyed to the vertical shaft 38.

Figure 6:
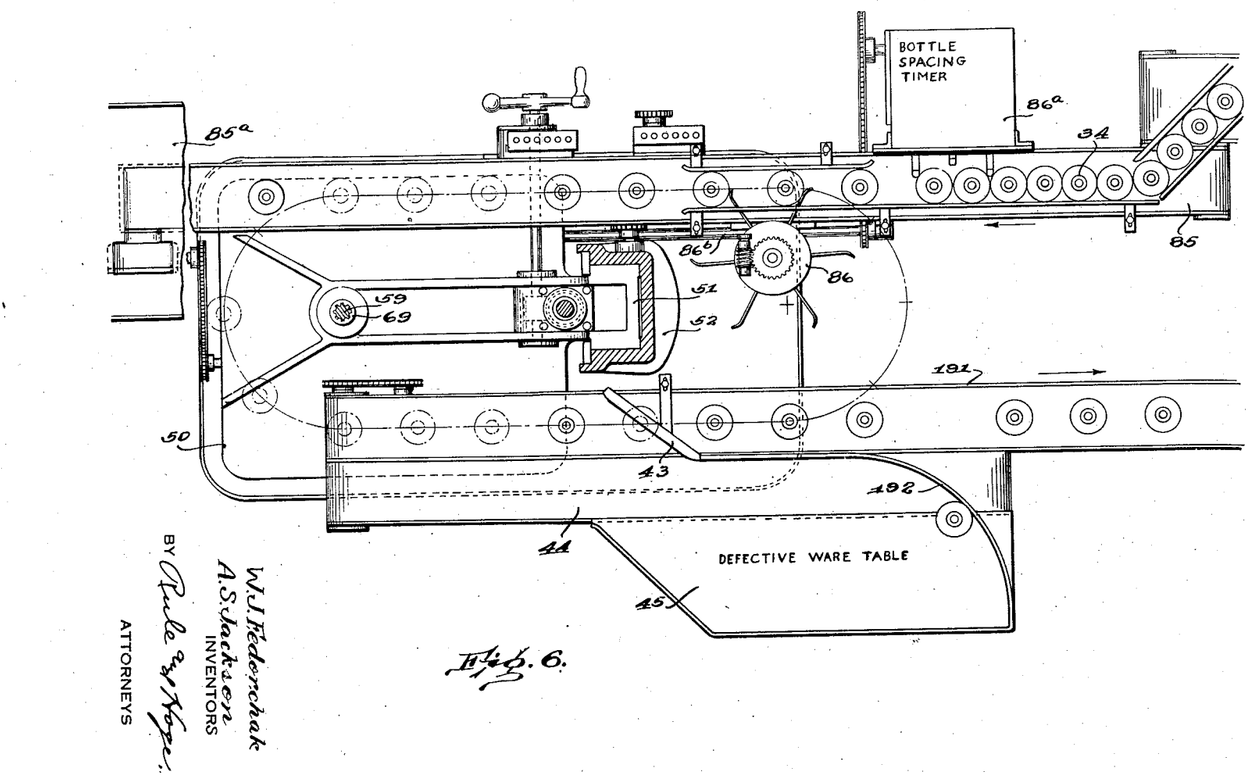
Fig. 6 is a part-sectional plan view taken at the line 6—6 on Fig. 1.

The bottles 34 which are to be tested may be transferred directly from the annealing leer to the gauging machine by means of the horizontal traveling conveyor 85 (Figs. 2 and 6). The bottles are correctly spaced and timed to be brought directly beneath and in register with the lifting spindles by means of a timer device 86$^a$ and a star wheel 86. The parts 86, 86$^a$ are driven from the gearing in the gear case 68, through a gear train including a shaft 86$^b$.

When a bottle is brought beneath and in register with a spindle 32, the latter is lowered so that the nozzle 33 enters the neck of the bottle. The lifting and lowering movements of the spindles are controlled by a stationary track 87 (Figs. 1, 2, 5, 7). Each spindle carries a roll 88 running on said track. As each bottle is brought beneath a spindle by the conveyor 85, a dip section 87$^a$ (Fig. 2) of the cam track, permits lowering of the spindle so that the nozzle 33 enters the bottle (Fig. 8).

The construction of a gauging unit 30 will now be described, reference being had, for example, to Figs. 7 and 8. The supporting bar or frame 31 is formed with upper and lower bearing sleeves 89 in which the tubular spindle 32 is mounted for rotation and for vertical reciprocation. Attached to the lower end of the spindle is a head comprising an inner block or disk 90 surrounded by a sleeve 91 provided with exterior screw threads. The disk 90 carries a sealing pad 92 of rubber or other suitable material for seating on the lip of the bottle and forming a hermetic seal. The nozzle 33 is formed with a shank extending upwardly through the sealing pad and disk 90 and is secured within the latter by a set screw 93.

A pair of gripping jaws 94 are pivotally mounted on a supporting ring 95 threaded on the sleeve 91. The pivot pins 96 for the jaws are mounted in lugs formed on the ring 95. A sleeve 97, mounted to slide up and down on the spindle 32, has threaded thereon, a cap 98 which has slot and pin connections 99 with the gripping jaws 94. It will be seen that with this construction, up-and-down movement of the cap 98 on the spindle will cause opening and closing movement of the jaws. A light coil spring 100, held under compression between the cap 98 and the ring 95, serves to hold the jaws 94 in open position while the spindle is in its lowered position. A coil spring 101 is mounted on the spindle 32 above the sleeve 97. A collar 102 mounted on the spindle above the spring 101 and which may be attached to said spring, is free to slide up and down on the spindle.

When the spindle 32 is lowered, the pad 92 seats on the neck of the bottle. Suction is then applied, as hereinafter described, to produce a partial vacuum within the bottle, so that when the spindle is raised, the bottle is lifted. The jaws 94 are held open by the spring 100 while the spindle is in its lowered position. As the spindle approaches the limit of its upward movement, the collar 102 engages the lower bearing sleeve 89 of the bar 31 and operates through the spring 101 to arrest the upward movement of the sleeve 97 while the spindle continues its upward movement, so that the jaws are swung to closed position. The spring 101 being comparatively stiff, effects this closing movement before there is any substantial compression of the spring 101. The latter is compressed to a greater or lesser degree during the final upward movement of the spindle, depending on the diameter of the bottle neck which determines the closed position of the jaws. The gripping jaws 94, although not always essential to the gauging operation, serve the important function of holding the bottle rigidly and preventing any side swing which might interfere with the testing operations.

Figure 4:
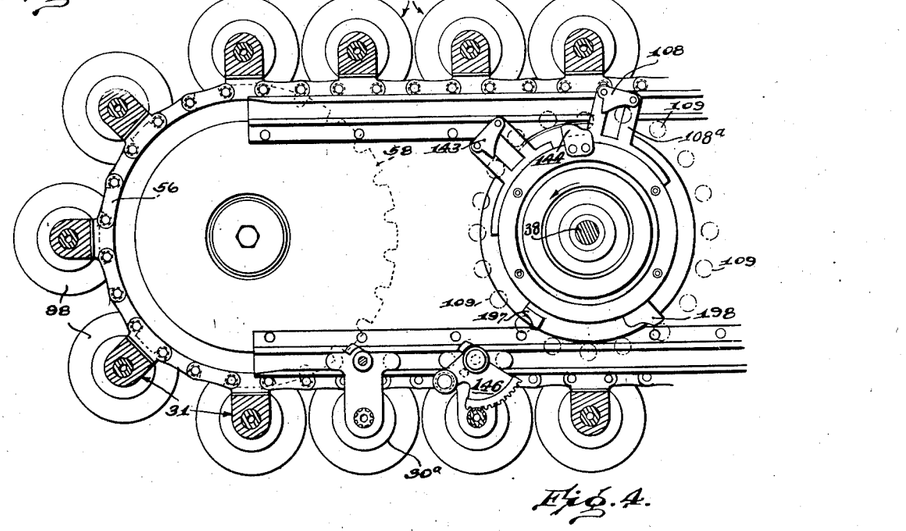
Fig. 4 is a fragmentary part-sectional plan view on a larger scale.
Figure 7:
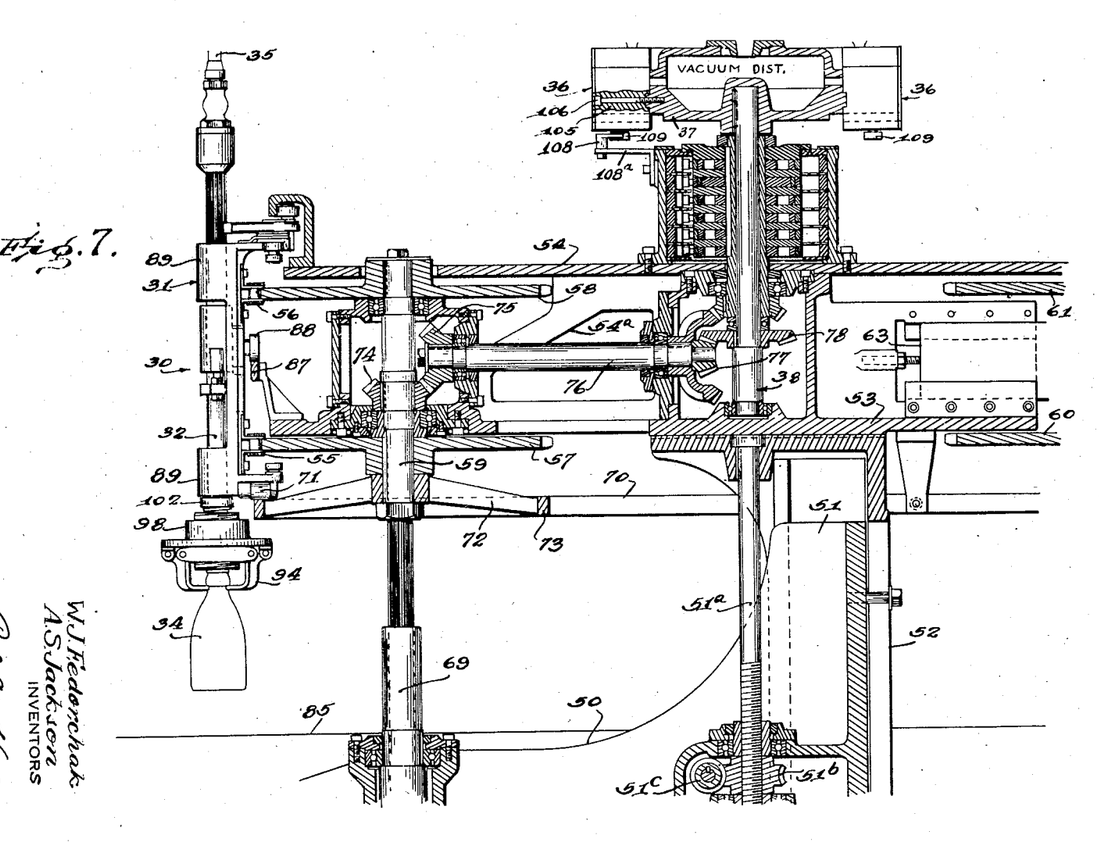
Fig. 7 is a longitudinal sectional elevation at the line 7—7 on Fig. 3.
Figures 8, 9:
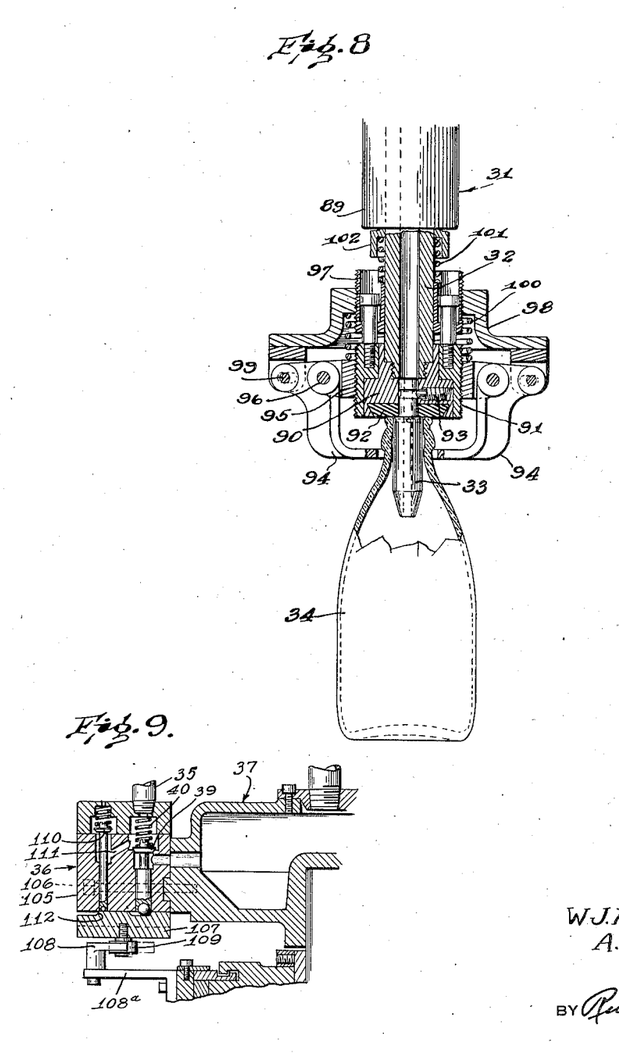
Fig. 8 is a part-sectional elevation of a bottle holding and testing unit.
Fig. 9 is a fragmentary sectional elevation showing the vacuum distributing head and a suction valve unit attached thereto.

Referring to Figs. 7 and 9, each suction valve unit 36 includes a block 105 attached by bolts 106 to the vacuum distributing head 37. The vacuum valve 39 therein is closed by a spring 40 and is opened by means of a slide 107 mounted on the lower face of the block 105 for movement radially of the distributor head 37. The slide is actuated by means of stationary cams including a valve opening cam 108 (Figs. 4 and 9) mounted on a stationary bracket 108ᵃ in position to project into the path of a cam roll 109 on the slide. A relief valve 110 mounted in the block 105 is also actuated by the slide 107. The relief valve when lifted to its open position (Fig. 9) provides communication through a port 111 with the vacuum line above the valve 39 for venting the bottle and thereby dissipating the vacuum. The cam 112 (Fig. 9) for opening the relief valve 110 is so arranged that when the slide 107 is in its outermost position (Fig. 9) the relief valve is open and the suction valve 39 is closed. When the slide is moved to an intermediate position the relief valve is closed while the suction valve remains closed. When the slide is moved to the limit of its inward movement, the suction valve 39 is opened while the relief valve remains closed.

When a gauging unit 30 during its travel is brought to the dip section 87ᵃ of the cam (Fig. 2) and lowered, the nozzle of said unit enters the bottle at position 34ᵃ so that the lifting spindle normally seats on and seals the bottle. The cam 108 (Fig. 4) now engages the cam roll 109 individual to the bottle under test and moves the attached slide 107 inwardly, thereby closing the relief valve and opening the vacuum valve so that suction is applied to the bottle. Immediately or very shortly after the cam 108 has thus operated, a stationary cam 144 engages the cam roll and moves it outwardly to its intermediate position in which the suction valve 39 is closed while the relief valve remains closed, thereby leaving the bottle sealed with a partial vacuum therein. This permits the bottle to be tested for leaks and other imperfections as presently described.

After the cam roll 109 has passed the cam 144, the corresponding lifting spindle is raised a short distance by a cam section 87ᵈ (Fig. 2) which is at a somewhat higher level than the section 87ᵃ and thereby lifts the bottle under test a short distance above the conveyor 85 providing a partial vacuum has been maintained within the bottle.

It sometimes happens that when the spindle has been lowered onto a bottle at position 34ᵃ (Fig. 2) and the corresponding suction valve has been opened by the cam 108 followed by the closure of the relief valve 110 as above described, it is found that the bottle is not vacuumized. This may be due to failure of the pad 92 (Fig. 8) to make a perfect seal where the finish of the bottle is defective or may be due to a perforation of the bottle wall or some other irregularity or defect which allows air to enter the bottle. The spindle in this case will fail to lift the bottle which will then be carried by the conveyor 85 into the discard.

If the spindle succeeds in lifting the bottle, the latter is further tested for slow leakage. This test is dependent upon the closing of the vacuum valve by the operation of the stationary cam 144 (Fig. 4) as above noted, thereby sealing the bottle with a partial vacuum therein. If there is a slow leak due to any cause such as a pinhole opening, an imperfect bottle lip or other defect, the vacuum is gradually dissipated. As a result the bottle is released from the lifting spindle and drops onto the conevyor 85 by which it is carried into the discard.

If the bottle passes the above described tests, it is transferred by the spindle conveyor to the opposite side of the machine to a position over a conveyor 191 and is then subjected to a further test while suspended over said conveyor and advancing therewith. In order to insure the bottle being held on the spindle during said transfer, the spindle is held in its lifted position by the track 87 which extends at its high level to a point over the conveyor 191. Also the vacuum valve 39 is opened and the relief valve 110 closed by a stationary cam 143 (Fig. 4) which engages the roll 109 and moves the valve slide 107 to its innermost position. When the bottle has been carried by the spindle to a position over the conveyor 191, a cam 197 (Fig. 4) moves the slide 107 outwardly to its intermediate position, thus closing the valve 39, leaving the bottle sealed with a partial vacuum therein. The spindle is also lowered by a dip section 87ᵇ of the cam track 87, thereby permitting the bottle gripping jaws 94 to swing open.

If there is a leak permitting the vacuum to be dissipated, the bottle drops from the spindle onto the conveyor 191 and is carried forward by the conveyor to a deflector 43 by which the bottle is deflected onto an endless belt conveyor 44 which travels in the same direction as the conveyor 191. A deflector 192 overlying the conveyor 44 guides the bottle onto a ware table 45.

If the bottle passes this final test, it is lifted by the spindle as the latter passes beyond the dip section 87ᵇ and is carried over and past the deflector 43. After passing the deflector 43, the spindle is again lowered by a dip section 87ᶜ of the cam. The cam roll 109 then engages a cam 198 (Fig. 4) which moves the slide 107 to its outermost position, thus opening the relief valve 110 so that the vacuum is dissipated and the bottle released to the conveyor 191. The bottles which thus pass the tests are carried by the conveyor to a packing station or to packaging mechanism by which they are packed in cartons.

It will be understood that instead of subjecting the bottles to separate tests for slow leakage, said tests being made respectively while the bottles are over the conveyors 85 and 191 at opposite sides of the machine, a single test may be found sufficient. This single test may be extended to any length of time desired by correspondingly increasing the length of the conveyor 85. Also if desired, the two separate slow leakage tests may be combined into a single test by omitting the cam 143, so that the bottles remain sealed with a partial vacuum therein from the time the cam 144 operates until the bottles have passed the deflector 43 (Fig. 6) and the cam 198 operates to open the relief valve and release the bottles which have passed the test to the conveyor 191.

Certain gauging operations disclosed in the above Patent 2,352,091, require the bottles to be rotated about their axes during such operations. The means for rotating the bottles include segmental racks 146 (Figs. 3, 4 and 7) individual to the spindles, each rack having a pivotal mounting on the upper end of the spindle frame 31. The racks are oscillated about their pivots in one direction by a stationary cam track 150 which engages cam rolls 151 carried on the racks. The racks are rotated in the reverse direction in like manner by a cam track 152. The racks 146 mesh with gear teeth formed on the upper portions of the spindles 32, thus rotating the spindles and the bottles suspended thereby.

Modifications may be resorted to within the spirit and scope of our invention.

We claim:

1. Apparatus for testing bottles and other hollow articles, comprising a lifting spindle including a nozzle, a carrier on which the spindle is mounted, said carrier being movable in a horizontal plane for carrying the spindle and articles thereon to different positions, means for moving the spindle downward and causing the nozzle to enter an article under test, a sealing pad carried by the spindle and adapted to seat on the mouth of the article when the spindle is lowered, said spindle and nozzle being fromed with a passageway therethrough, means for applying suction through said passageway and thereby producing a partial vacuum within the article, means for lifting the spindle and the vacuumized article to an elevated position while the article is held by suction, a pair of holding jaws carried with the spindle, means for holding the jaws open while the spindle is in its lowered position and during the initial portion of said lifting movement of the spindle and vacuumized article, and automatic means for causing said jaws to grip and hold the article against side swing during said movement of the carrier while the spindle is in said elevated position.

2. Apparatus for testing bottles and other hollow articles, comprising a lifting spindle including a nozzle, a carrier on which the spindle is mounted, said carrier being movable in a horizontal plane for carrying the spindle and articles thereon to different positions, means for moving the spindle downward and causing the nozzle to enter an article under test, a sealing pad carried by the spindle and adapted to seat on the mouth of the article when the spindle is lowered, said spindle and nozzle being formed with a passageway therethrough, means for applying suction through said passageway and thereby producing a partial vacuum within the article, means for lifting the spindle and the vacuumized article while the latter is held by suction, a stop to arrest the spindle in its lifted position, a pair of holding jaws carried with the spindle, automatic means interposed between said stop and jaws and operable during the final upward movement of the spindle for causing said jaws to grip and hold the article against side swing while the spindle is in its lifted position, and automatic means operable when the spindle is lowered to an intermediate position for swinging the jaws to open position while the article is suspended from the spindle and held thereon by the pneumatic pressure differential.

3. Apparatus for testing bottles and like hollow articles, said apparatus comprising a horizontally traveling conveyor, means for delivering the articles to the conveyor and spacing them thereon, an endless horizontally traveling spindle carrier positioned above said conveyor, spindles on said carrier, means for driving the said spindle carrier horizontally in a closed path, means for driving said conveyor, means for lowering each spindle at a predetermined point during its travel, each said spindle being brought when lowered into sealing contact with an article on the conveyor, a vacuum distributing head comprising a vacuum chamber, means for rotating said head about a vertical axis, an annular series of suction valve units mounted to rotate with said head, means providing suction lines extending from said vacuum chamber through the said valve units and to the spindles, suction valves in said valve units movable into positions for opening and closing the suction lines, a stationary cam, means operable by said cam for opening each valve while the corresponding spindle is in said lowered position and thereby vacuumizing the article and causing a holding engagement between the article and the spindle, means for lifting each spindle at a predetermined point during its travel with the article and thereby lifting and suspending the article, and means for closing the suction valve while the article is vacuumized, leaving said article suspended from the spindle and held thereon by suction.

4. Apparatus for testing bottles and like hollow articles, comprising a conveyor mounted to travel horizontally in a straight path, means for delivering the articles to the conveyor and spacing them thereon, a spindle carrier positioned above said conveyor, spindles on the carrier, means for driving the said conveyor and carrier, means for guiding the spindle carrier and spindles in a closed path comprising a straight horizontal portion overlying and parallel with the said path of the conveyor, a stationary cam track supporting the spindles during their travel, said track being arranged and shaped to cause lowering and lifting of each spindle at predetermined points during its travel, each said spindle being brought when lowered, into sealing contact with an article on the conveyor, means for vacuumizing each article while a spindle is in said lowered position thereon and thereby effecting a holding engagement between the article and spindle, said cam track lifting each spindle at a predetermined point during its travel with the article and thereby lifting and suspending the article, said spindle carrier path comprising a horizontal curved portion forming an extension of said straight portion and divergent from the conveyor path therebelow, whereby the articles which hold the vacuum while suspended are carried in said divergent path away from the conveyor, while articles in which the vacuum is dissipated by leakage are returned to the conveyor and segregated from the other articles.

5. Apparatus for testing bottles and like hollow articles, said apparatus comprising a vacuum distributing head mounted for rotation about a vertical axis, driving mechanism connected to rotate said head, said head comprising a vacuum chamber, an annular series of valve units mounted for rotation with said head in a horizontal circular path concentric with said axis, article holding spindles individual to said valve units, means for supporting and guiding said spindles for travel horizontally in an elongated closed path comprising a straight horizontal portion, mechanism for driving the spindles in said closed path and interconnected with said first mentioned driving mechanism, means providing vacuum lines extending from the vacuum chamber through said valve units to the spindles, said vacuum lines including flexible pipes extending from the valve units to the spindles, said valve units comprising vacuum valves in said vacuum lines, means for bringing said spindles into sealing engagement with the mouths of said articles, means for opening said valves and thereby vacuumizing the articles, and means for closing the valves and leaving the articles held by suction on the spindles.

6. Apparatus for testing bottles or similar hollow articles, comprising a horizontal conveyor, means for driving the conveyor and causing it to travel horizontally in a straight path, a spindle carrier mounted separately from the conveyor and positioned above the conveyor, lifting spindles on said carrier, means for driving the carrier and causing the spindles to advance with the conveyor, means for guiding the spindles in a closed path comprising a straight horizontal portion parallel with and spaced above and directly over the said conveyor and a portion laterally divergent from the conveyor therebeneath, means for lowering the spindles in succession as they advance, and causing each spindle to seat on a said article, means for applying suction through the spindles to each said article while a spindle is seated thereon and traveling horizontally therewith, thereby vacuumizing the article, and means for thereafter lifting the spindle while at an intermediate position during its said travel directly over the conveyor and thereby lifting and suspending the vacuumized article with the latter held by suction to the spindle while the vacuum is maintained and thereby carrying the article away from the conveyor, and releasing the article to the conveyor when leakage prevents the article from being held on the lifted spindle.

7. Apparatus for testing bottles or other hollow articles, comprising a horizontally-traveling conveyor forming a support for the articles, a tubular lifting spindle positioned above said support, means for causing the spindle to travel horizontally above said conveyor, means for lowering the spindle when it reaches a predetermined point during its said travel, from an elevated position to a lowered position in which it is in sealing engagement with the mouth of an article supported on and traveling with the conveyor, means for applying suction through the spindle and thereby vacuumizing the article, means for closing the spindle, means for lifting the spindle from said lowered position and thereby lifting the vacuumized article from its said support, automatic means operable independently of the suction for gripping and holding the article on the spindle when the latter is in its said elevated position, and automatic means for releasing the gripping means when the spindle is lowered to an intermediate position, leaving the article attached by suction to the spindle and free to drop if the vacuum therein is dissipated by leakage.

8. Apparatus for testing bottles or other hollow articles, comprising a bottom support for the articles, a lifting spindle, a carrier on which the spindle is mounted above said support, said carrier being movable horizontally for carrying the spindle and an article thereon to different positions, means for moving the spindle up and down between an elevated position in which it is spaced above an article resting on said support and a lowered position in which the spindle is in sealing engagement with the mouth of the article, suction means for withdrawing air from the article and thereby effecting a holding connection of the spindle to the article while the spindle is in said lowered position, whereby the article will be supported on the spindle by suction when the spindle is lifted, article gripping means carried by the spindle, automatic means for actuating the gripping means when the spindle is in said elevated position and thereby causing the gripping means to grip the article and hold it independently of the suction and thereby prevent side swing during said horizontal movement, and means for automatically releasing the gripping means when the spindle is lowered to a position below said elevated position.

9. Apparatus for testing hollow articles, comprising a conveyor forming a support for the articles to be tested, means for driving the conveyor and articles supported thereon in a horizontal straight path, tubular testing spindles, means connecting the spindles in an endless chain, means for driving the chain of spindles in a closed path including a straight horizontal section overlying said straight path of the conveyor and spaced thereabove, means for causing articles on the conveyor to register with the said spindles, means for lowering the spindles into sealing engagement with the articles therebeneath and for lifting the spindles, a vacuum distributing head mounted for rotation about a vertical axis, an annular series of valve units individual to the spindles and mounted to rotate with said head in a horizontal circular path concentric with said axis, means providing suction lines extending from the distributing head through the valve units to said spindles for applying suction through the spindles to the said articles, each said valve unit comprising a valve in the suction line, and stationary valve operating devices positioned and arranged to open and close each said valve at predetermined points during the rotation of the valve unit.

10. Apparatus for testing hollow articles, comprising a conveyor forming a support for the articles to be tested, means for driving the conveyor and articles supported thereon in a horizontal straight path, tubular testing spindles, means connecting the spindles in an endless chain, means for driving the chain of spindles in a closed path including a straight horizontal section overlying said straight path of the conveyor and spaced thereabove, means for causing articles on the conveyor to register with the said spindles, means for lowering the spindles into sealing engagement with the articles therebeneath and for lifting the spindles, a vacuum distributing head mounted for rotation about a vertical axis, an annular series of valve units individual to the spindles and mounted to rotate with said head in a horizontal circular path concentric with said axis, each said valve unit comprising a valve chamber and a valve therein, means providing suction lines extending from said distributing head to said valve chambers and from said valve chambers to the tubular spindles, valves in said chambers operable to open and close the suction lines, and stationary valve operating devices positioned in the path of said valve units and operable to operate said valves at predetermined points during the rotation of the valve units.

11. Apparatus for testing hollow articles, comprising a conveyor forming a support for the articles to be tested, means for driving the conveyor and articles supported thereon in a horizontal straight path, tubular testing spindles, means connecting the spindles in an endless chain, means for driving the chain of spindles in a closed path including a straight horizontal section overlying said straight path of the conveyor and spaced thereabove, means for causing articles on the conveyor to register with the said spindles, means for lowering the spindles into sealing engagement with the articles therebeneath and for lifting the spindles, a vacuum distributing head mounted for rotation about a vertical axis, an annular series of valve units individual to the spindles and mounted to rotate with said head in a horizontal circular path concentric with said axis, each said valve unit comprising a valve chamber, suction lines extending from the vacuum distributing head through the said valve chambers and to the spindles, each said valve unit including a vacuum valve in the chamber movable to and from positions for opening and closing the suction line and a relief valve for venting the suction line, and stationary valve operating devices for automatically opening each vacuum valve while the corresponding spindle is seated on a said article and for then closing the vacuum valve, whereby when the spindle is lifted, the article is held suspended by suction, said stationary valve operating devices including means for operating said relief valves and thereby releasing the articles from the spindles.

WILLIAM J. FEDORCHAK.
ALBERT S. JACKSON.

REFERENCES CITED

The following references are of record in the file of this patent:

UNITED STATES PATENTS

| Number | Name | Date |
|---|---|---|
| 469,302 | Page | Feb. 23, 1892 |
| 498,408 | Roth | May 30, 1893 |
| 2,309,231 | Bagley | Jan. 26, 1943 |
| 2,314,310 | Jackson et al. | Mar. 16, 1943 |
| 410,300 | Steegmuller | Sept. 3, 1889 |
| 603,874 | Christie | May 10, 1898 |
| 2,177,019 | Egenolf | Oct. 24, 1939 |